Patented Oct. 7, 1941

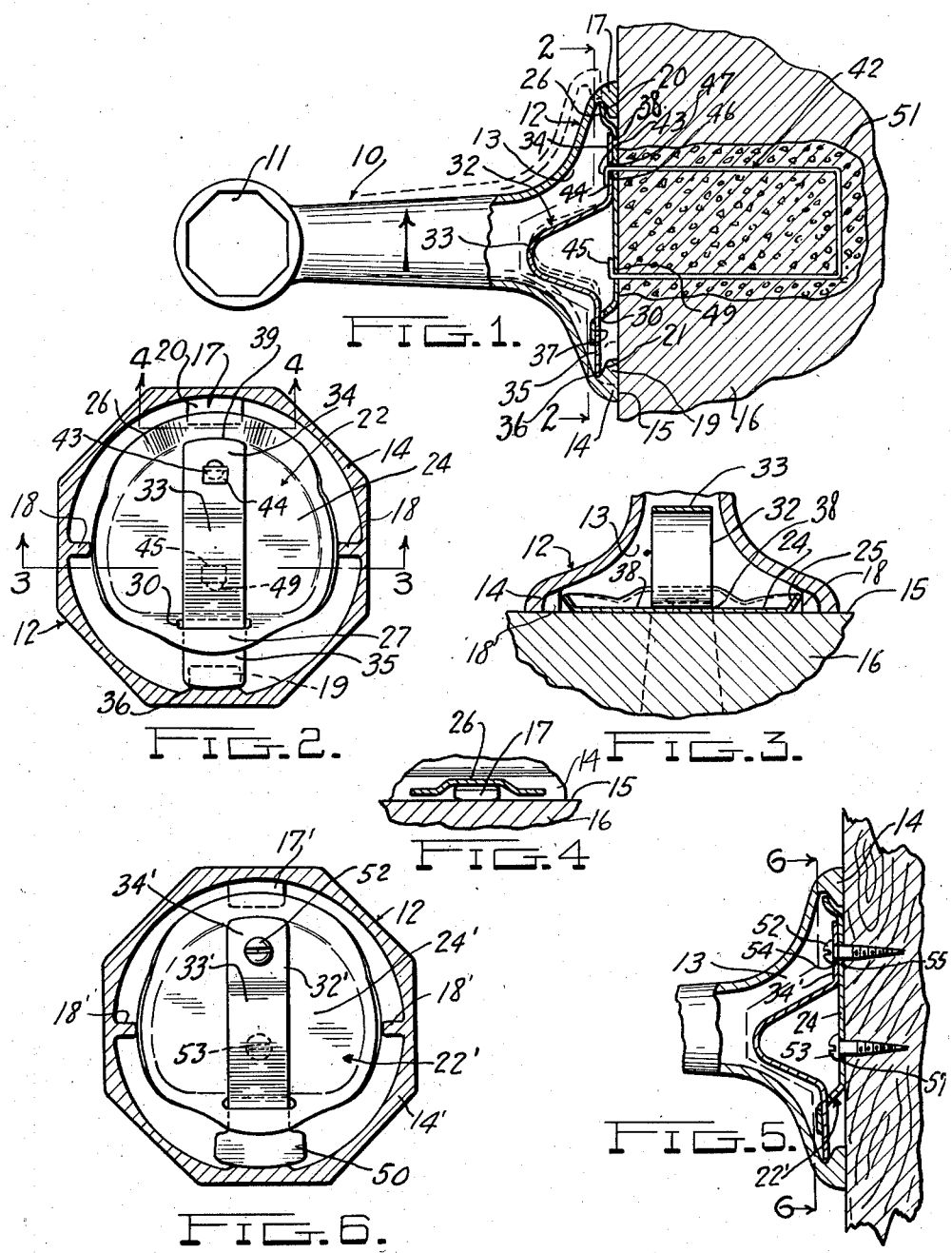

2,258,264

UNITED STATES PATENT OFFICE 2,258,264

WALL FIXTURE

Charles A. Schultz, Toledo, Ohio, assignor to Geritz Adrian Manufacturing Corporation, Adrian, Mich., a corporation of Michigan Application August 2, 1938, Serial No. 222,661

3 Claims. (Cl. 248—223)

This invention relates to fixtures or wall brackets and more particularly to fastening means therefor whereby the fixture may be mounted upon a wall or equivalent element in a simple manner having the fastening means concealed from view.

The invention embraces an improved fixture or wall bracket having fastening means serving to urge the marginal portion automatically into tight engagement with the wall or support and permitting the easy removal of the fixture or wall bracket.

The invention includes a wall bracket or fixture having pressure interlocked surfaces serving to fixedly hold the fixture in place which are concealed from view.

An object of the invention is the provision of means for coupling two or more body members and holding the same together, including an element formed to a configuration which can be modified by the coupling or uncoupling of said body members.

Another object of the invention is the provision of a fastening structure or support including distortable means for holding the bracket or fixture in position permitting its quick removal therefrom.

Another object of the invention is the provision of a wall bracket or fixture having fastening means whereby the fixture can be mounted, locked in place and removed from its support by causing relative movement between the fastening means and the wall bracket in a direction opposite to that of the load application.

A further object of the invention is the provision of supporting and holding means for fixtures wherein the supporting and holding means are made of sheet metal including a resilient or flexible element formed to a configuration which is modified when the fixture is removed or mounted in position.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view of a wall bracket or fixture with certain parts removed to illustrate the fixture fastening means of the invention;

Figure 2 is a sectional view taken substantially on line 2—2 of Figure 1;

Figure 3 is a sectional view taken substantially on a plane passing through lines 3—3 of Figure 2;

Figure 4 is an enlarged sectional view taken substantially on line 4—4 of Figure 2;

Figure 5 is a view similar to Figure 1 illustrating a modified form of the invention;

Figure 6 is a sectional view taken substantially on line 6—6 of Figure 5.

In the drawing I have shown a preferred form of my invention used as coupling means for mounting and holding a fixture in any desired position on a wall or other supporting surface, the particular type of fixture illustrated to show such use being in the form of a towel bracket. However, it is to be understood that I contemplate the use of my invention whenever the same may be found to be applicable.

Referring to the drawing and particularly Figures 1 to 3 inclusive, the fixture 10 is formed at one end with a towel bar receiving head 11 and with an enlarged base 12 having a recessed or hollow portion 13 terminating into a flat marginal section 14 adapted to lie flush or in intimate contact with the surface 15 of the wall 16. The marginal portion 14 is preferably of internal circular configuration having a pair of inwardly disposed projections 17 and 19 which are substantially diametrically opposed and has also a pair of positioning lugs 18. The projections 17 and 19 are in the form of wedge or cam shaped elements, each having an upper angularly disposed or beveled surfaces 20 and 21 respectively which are convergent toward the central portion of the base element, as particularly shown in Figure 1.

The base 12 is adapted to surround and enclose a dish shaped member 22. This member 22 is preferably made of sheet material having a uniplanar surface 24 from which projects a flared section 25 formed with opposed substantially flat raised flanges 26 and 27, each extending outwardly and lying in planes spaced from the uniplanar section 24. Adjacent to the peripheral flat surface 27 and preferably located in the flared section 25 is an opening or slot 30 which is adapted to receive suitable resilient means associated with said member.

The resilient means in the embodiment shown are illustrated in the form of a flexible element 32 preferably made of spring sheet material having an intermediate curved portion 33 and substantially flat end sections 34 and 35 located in different planes. The flat section 35 is adapted to pass through the opening 30 and contact with the lower face 37 of the flat surface 27 of member 22. It should be noted as particularly shown in Figure 1, that the extremity 36 of the flat section 35 of the resilient member 32 extends beyond the peripheral edge of the flat surface 27 while the flat section 34 of this flexible member is in contacting engagement with the upper face 38 of uniplanar surface 24 of member 22, having its extremity 39 in contact with the marginal flared section 25 of member 22, thereby aiding to take any lateral pressure applied to the resilient member 32 and thus preventing any sliding movement therebetween. The dish-shaped member 22 and resilient element 32 comprise the coupling means for the bracket 10 and are held together and in turn secured in fixed relation to the surface 15 of wall 16 by suitable attaching or wall anchoring means.

In the embodiment of the invention shown in Figures 1 to 3 inclusive the wall attaching means for the dish-shaped member 22 are in the form of an anchoring device 42 which is embedded in the wall surface 16. The anchoring device 42 is preferably made of sheet material comprising a band formed to a substantially U-shaped configuration having the leg members terminating into reduced end portions 43 and 45, the end portion 43 adapted to be received and passed through aligned openings 46 and 47 formed respectively on the uniplanar surface 24 of member 22 and on the flat surface 34 of resilient element 32 while the end portion 45 is adapted to be received and passed through an opening 49 formed on the uniplanar section 24 and spaced from the opening 46. The end portions 43 and 45 are bent over as at 44 to fixedly secure the uniplanar surface in contact with the wall portion and at the same time retain in proper engagement therewith the end portion 34 of the resilient member 32, thus preventing the separation of the resilient member from the dish shaped member.

The anchoring device 42 of the wall attaching means may be permanently secured to the wall or support 16 by forming an opening 51 slightly larger than the area occupied by the U-shaped configuration of the member 42 and by filling the opening 51 while the anchoring device is placed thereon with suitable mortar or cement so that the subassembly comprising the anchoring device 42, dish-shaped member 22 and resilient element 32 is permanently secured to the wall surface 15 when the mortar or cement takes its final setting, producing a bond between the wall proper and the anchoring device 42.

Figures 1 and 2 illustrate in full lines the fixture and coupling means in forced interlocking engagement or normal position whereby the latter serve as means for holding and fixedly retaining the fixture in contact with the wall or support. In the position shown it can be seen that the inwardly disposed projection 17 of the base 12 is in engagement with the flange 26 of the dish-shaped element 22 while the base projecting portion 19 is in engagement with the extremity 36 of the distortable or flexible element 32.

Due to the fact that the diameter or overall distance between the ends of the locking surfaces of the coupling means is greater than the diameter or distance between the projections 17 and 19, there is thus provided a forced interlocking engagement therebetween. This forced interlocking engagement is caused by the expansive flexure of the element 32 which is placed under tension and produces not only a forced engagement of the locking surfaces of the coupling means with the projections in the base member to support the fixture in position but at the same time by reason of the inclined faces of the wedge or conically shaped projections 17 and 19, the marginal portion 14 of the base element 12 is cammed or urged into close engagement with the surface 15 of the wall or supporting element 16. The locating lugs 18 aid in the proper centralization and positioning of the base 12 with respect to the coupling means including the dish-shaped element 22.

It can be seen by examination of Figure 1 that when it is desired to remove the bracket 10 from its wall fixing means, or from the position shown in full lines, it is only necessary to move the bracket 10 in a direction to cause a further flexure of the resilient element 32 which is produced by force transmitted to the extremity 36 of the member 32 by the camming projection 19 so that the curved section 33 of the resilient member 32 will be distorted or its configuration changed to that illustrated in dotted lines in Figure 1. The application of force in the direction indicated by the arrow will also move the bracket with respect to the dish-shaped element reducing the overall distance between the edge of flange 26 of the dish-shaped element and the extremity 36 of the resilient member 32. This reduction in dimensions of the locking means allows that the camming element 17 be removed from contacting engagement with the flange 26 and that the inner edge of member 17 can pass over the peripheral edge of said flange, as shown in dotted lines in Figure 1, thus permitting the removal of the bracket 10 from its support or wall fixing means.

When the fixture bracket 10 is separated from the coupling means and it is desired to place the same in its normal position on the wall or support it will only be necessary to place the base 12 over the dish-shaped element 22 so that the camming projection 19 is located between the lower face of the flat section 35 of the resilient member and the surface 15 of the support and by moving the bracket 10 in the direction of the arrow the resilient member 32 is flexed to a position which allows that the inner edge of the camming element 17 passes over the peripheral edge of the flange 26 so that the camming element 17 is positioned between the wall surface 15 and flange 26 whereby when the force applied to the bracket 10 is removed the inherent expansive force of the element 32 produces a wedging action between the camming elements 17 and 19 and the locking surfaces 26 and 36 of the coupling means so that the interengaging surfaces are forced into interlocking engagement because when these surfaces are in engagement the resilient element 32 is under tension or flexed.

It is important to note that due to the inclined surface or conically shaped section of the camming projections 17 and 19 of the base member 12 and the pressure extended thereto by the coupling means through the action of the resilient element 32 the marginal section 14 of the bracket 10 will be retained in tight engagement with the surface of the support, thereby preventing unsightly gaps between the fixture proper and the surface of the supporting element, and concurrently increasing the load carrying capacity of the fixture by distributing the load between the fastening means and the surface of the support.

Figures 5 and 6 show an arrangement similar to the one herein described differing from the embodiment illustrated in Figures 1 to 4 by having the resilient member provided with an enlarged portion 50 for the purpose of permitting a limited circular shifting of the bracket with respect to its support so that disalignment or inaccuracies in placing the fixture could be compensated for by moving the same with respect to the holding and supporting means as well as a different type of means for fixing the coupling means to the supporting structure. In this form of the invention the resilient member is formed with enlarged portion 50 adapted to cover a comparatively large radial span, thus permitting that the fixture can be relatively moved and held in different positions with respect to the fixture holding means. In the form of the embodiment illustrated in Figures 5 and 6, the coupling means are held in fixed position and secured to a support by means of suitable screws 52 and 53, the screw 52 passing through aligned openings 54 and 55 formed respectively in the flat section 34' of the resilient member 32' and the uniplanar section 24' of the dish-shaped element 22'. Screw 53 also secures the uniplanar section 24' to the support by passing through opening 57 formed thereon. In this form of the invention the flexure of the resilient element 32' caused by moving the bracket in an opposite direction to that of the load permits the quick removal and mounting of the bracket in locked position with respect to its support.

It is apparent that within the scope of the invention, modifications and different arrangements may be made other than is herein disclosed, and the present disclosure is illustrative merely, the invention comprehending all variations thereof.

What I claim is:

1. A bracket adapted to be secured to a support including a base having a recessed portion provided with diametrically inwardly disposed opposing marginal surfaces; a member having a uniplanar section fixed to said support adapted to be received within the recessed portion of said bracket, said member having a raised surface adapted to be engaged by an inwardly disposed marginal surface of said bracket; a resilient element fixed to said member having a portion spaced from said uniplanar section extending diametrically of said member adapted to be engaged by the other diametrically opposed surface of said bracket, the engaging surfaces being urged by said resilient element into forced interlocking engagement with each other and being concealed by said bracket for securing the same to the support.

2. In combination, a fixture adapted to be secured to a support including a base having a recess and a marginal section; a plurality of inwardly extending cam shaped projections formed on the inside wall of said marginal section; a sheet metal member adapted to be located within said recess and confined by said marginal section, said member having a flat section fixed to a support and a raised flange portion adapted to be engaged by one of the inwardly disposed cam shaped projections of said fixture; a resilient element fixed to said member having an extension projecting beyond said member, said extension adapted to engage another of the inwardly disposed cam shaped projections of said fixture, the extension of the resilient element and the raised flange of the sheet metal member being resiliently forced into interlocking engagement with the cam shaped projections by said resilient element and said marginal section through the cam shaped projections being urged into tight engagement with the support concealing from view said sheet metal member and element.

3. A fixture including a member having a uniplanar surface; a marginal raised portion extending away from the uniplanar surface; means for securing said member to a support with the marginal portion extending away from said support and the uniplanar surface in engagement therewith, a resilient element having a portion fixed to said member and a portion spaced therefrom and movable with respect thereto, said raised portion of said member being provided with an opening through which one end of said resilient element projects beyond the marginal portion of said member.

CHAS. A. SCHULTZ.

CERTIFICATE OF CORRECTION.

Patent No. 2,258,264. October 7, 1941.

CHARLES A. SCHULTZ.

It is hereby certified that the name of the assignee in the above numbered patent was erroneously written and printed as "Geritz Adrian Manufacturing Corporation" whereas said name should have been written and printed as --Gerity Adrian Manufacturing Corporation, of Adrian, Michigan, a corporation of Michigan--, as shown by the record of assignments in this office; and that the said Letters Patent should be read with this correction therein that the same may conform to the record of the case in the Patent Office.

Signed and sealed this 18th day of November, A. D. 1941.

(Seal)

Henry Van Arsdale,
Acting Commissioner of Patents.